United States Patent [19]
Weimer et al.

[11] Patent Number: 5,850,113
[45] Date of Patent: Dec. 15, 1998

[54] SUPER CAPACITOR BATTERY CLONE

[75] Inventors: Joseph A. Weimer, Springboro; Marian K. Kazimierczuk, Beavercreek; Robert C. Cravens, II, Bethel, all of Ohio

[73] Assignee: The United States of America as represented by the Secretary of the Air Force, Washington, D.C.

[21] Appl. No.: 843,408

[22] Filed: Apr. 15, 1997

[51] Int. Cl.⁶ .................................................. H01H 47/00
[52] U.S. Cl. ............................ 307/125; 307/43; 307/64; 307/85; 307/23; 307/82; 323/222; 323/224
[58] Field of Search ................................. 307/43, 44, 45, 307/46, 64, 65, 66, 70, 80, 82, 84, 85, 86, 87, 18, 23; 323/222, 223, 224, 282–285

[56] References Cited

U.S. PATENT DOCUMENTS

| | | | |
|---|---|---|---|
| 4,551,632 | 11/1985 | Jouredan et al. | 307/9 |
| 4,801,859 | 1/1989 | Dishner | 363/224 |
| 4,967,096 | 10/1990 | Diemer et al. | 307/19 |
| 5,256,907 | 10/1993 | Shimada et al. | 307/82 |
| 5,359,277 | 10/1994 | Cowett, Jr. | 323/207 |
| 5,602,464 | 2/1997 | Linowsky | 323/272 |
| 5,612,579 | 3/1997 | Wisbey et al. | 307/18 |
| 5,737,195 | 12/1994 | De Doncker et al. | 307/45 |

*Primary Examiner*—Jeffrey Gaffin
*Assistant Examiner*—Jonathan S. Kaplan
*Attorney, Agent, or Firm*—Gerald B. Hollins; Thomas L. Kundert

[57] ABSTRACT

An aircraft electrical supply bus supplementing arrangement in which electrical energy is stored in a large capacitor and energy flow between the capacitor and the bus is controlled by a bi-directional electrical converter circuit of the switched inductance type. The varying terminal voltage of the energy storing capacitor, a super capacitor, is coupled to the relatively fixed voltage of the aircraft supply bus by way of the voltage changing capability of the converter circuit switched inductance. Current flow levels in this inductance are controlled with a negative feedback regulator circuit. Energy storage efficiency in the converter is enhanced with respect to weight and physical size of the capacitor element by ability of the converter circuit to accept a widely varying input voltage while generating a relatively constant output voltage. Suppression of electrical transients and improved regulation of voltage on the aircraft energy supply bus especially at distal and bus impedance-isolated locations are achieved.

19 Claims, 6 Drawing Sheets

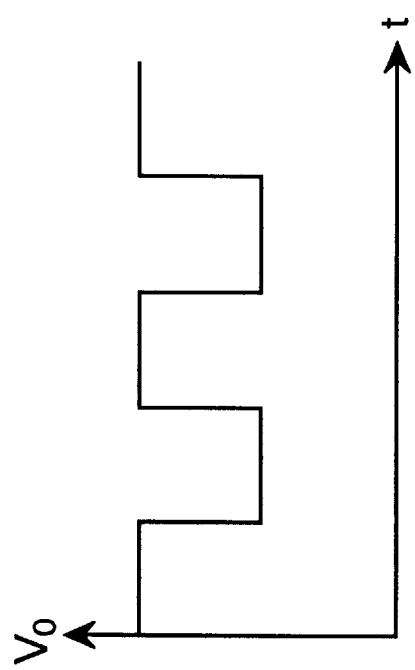
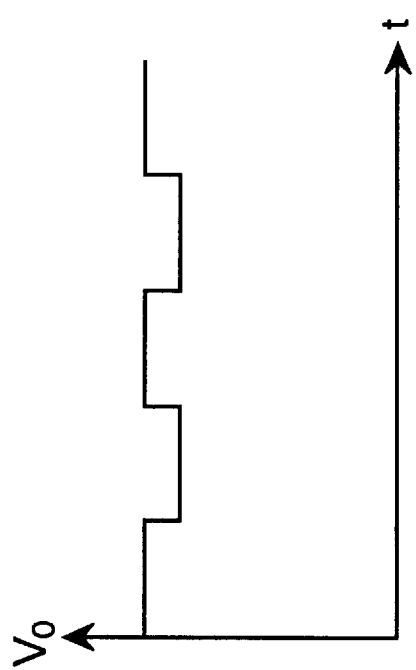

SUPER CAPACITOR BATTERY CLONE

RIGHTS OF THE GOVERNMENT

The invention described herein may be manufactured and used by or for the Government of the United States for all governmental purposes without the payment of any royalty.

CROSS REFERENCE TO RELATED PATENT DOCUMENTS

The present document is somewhat related to the copending and commonly assigned patent documents "Feedforward Control of Aircraft Bus DC Boost Converter", AFD 00129, Ser. No. 08/843,428; and "Super Capacitor Charging", AFD 00193, Ser. No. 08/843,406; which are filed of even date herewith. The contents of these related two applications is hereby incorporated by reference herein.

BACKGROUND OF THE INVENTION

This invention concerns the field of aircraft electrical energy supply systems and relates to the bi-directional flow of electrical energy into and out of battery substituting capacitive energy storage components usable with such aircraft systems.

Batteries are widely used to store electrical energy. However, use of batteries in an aircraft encounters numerous problems, problems largely relating to the electrochemical nature of an electrical battery, problems which include severe energy density limitations, environmental hazards, safety problems, maintenance costs, charging rate limitations, finite number of possible charge cycles and battery life, memory problems in some batteries such as the popular NiCd device, complicated charging circuits, and need for continuous replacement.

Future aircraft electrical energy supply systems in addition may involve the widespread use of a higher voltage direct current electrical energy distribution bus, a distribution involving energization by the rectified output of a polyphase alternator and voltages above the level of 100 volts, for example. In addition to greater levels of energy availability and reduced weight of conductor metal which is possible in such distribution systems, the use of higher voltage distribution in these future aircraft is seen to offer advantages in the area of lower bus current levels, smaller bus conductors, better electrical transient control or filtering, particularly as to filter weight reduction. These advantages are considered to outweigh the obvious complications of conventional battery exclusion from the bus (e.g., because of the large number of individual battery cells required), absence of bus-accomplished stand alone or static engine start capability, increased hazard to personnel and increased electrical insulation requirements. The F-22 tactical aircraft is perhaps one of the first aircraft with bus energization of this higher voltage direct current type to be considered for widespread use by the United States Air Force.

As an improvement to both these future high voltage aircraft systems, and also to present-day lower voltage direct current bus distribution systems as well, the use of energy storage accomplished in a replacement or a supplement to the commonly encountered electrical battery, e.g., the lead-acid or nickel-cadmium battery, is envisioned. Moreover, the use of such energy storage capability disposed at several distributed locations along the physical extent of an electrical bus or disposed within particular bus load devices (such as avionics or other electronic system housings) is a part of this improved aircraft bus thinking. Such energy storage capability may take the form of one or more storage elements which can float on the bus with little energy demand or current flow during normal operating conditions, employ relatively low current and long duration recharging times and then be capable of rapidly supplying energy to accommodate brief intervals of heavy bus demand or transient loading or bus source interruption. Such arrangements could, for example, enable further reductions in bus metal mass and cross-sectional area and improve voltage regulation along the bus, i.e., could enhance the tradeoff between bus size and bus voltage regulation.

The configuration of such energy storage elements used at distributed locations along a bus for this heavy demand or transient loading improvement is now considered to reasonably include large capacitance electrolytic capacitors, i.e., capacitors of the multiple farad electrical size or "super capacitor" type. In this configuration it is notable that the capacitor is employed as an energy storage element rather than for its low alternating current impedance or other characteristics. Indeed a super capacitor may not provide the lowest alternating current impedance available in a capacitor. Such "super capacitors" are, however, considered preferable to a battery for present energy storage uses for reasons of size, weight, reliability and decreased maintenance requirements, and are now readily available as commercial products. Capacitors of this nature are, however, most readily fabricated as units of large electrical size having moderate operating voltage capability. As noted below herein, sizes such as an integral number of farads of electrical capacitance and a few tens of operating volts capability are now conveniently provided. Capacitors of this electrical rating may of course be combined in appropriate series and parallel combinations for use in the present invention.

By way of additional background it may be interesting to consider that the super capacitor element itself was first investigated by Helmholtz in 1879. According to one super capacitor arrangement, one electrode of the device is made of carbon and the other is made of a liquid electrolyte. When a voltage is applied to the carbon layer with respect to the liquid electrolyte, a thin dielectric layer is established adjacent the carbon layer particles. The effective surface area of the dielectric layer and the carbon particles is, however, extremely large, i.e., surface areas on the order of 1000 square meters per gram of carbon material can be achieved because of the porous surface of the carbon and the small carbon particle size. The thickness of the dielectric layer on the other hand can be extremely small—on the order of one nanometer. As a result, a high ratio of surface area to dielectric thickness can be obtained and surprising capacitances per unit of capacitor volume are obtainable; therefore, desirable volumetric efficiency is obtained for such a capacitor. As may be surmised from a consideration of such structural details, however, questions of permissible operating voltage (i.e., the dielectric strength of the thin dielectric layer), tolerable current flow rates with resulting temperature rise, energy losses, liquid electrolyte inconvenience and physical stability of this type of super capacitor require special consideration in the capacitor's design and fabrication sequences.

The large capacitance of super capacitors nevertheless permits the storage of relatively large amounts of energy. As is well known in the electrical art, however, a change in the quantity of electrical energy stored in a super capacitor or any capacitor, unlike most battery types, involves a precisely related change in the capacitor's terminal voltage; the capacitor's stored energy quantity being a square-law function of the capacitor's terminal voltage. Therefore, in an energy storage use of such a capacitor there is a need for a power processing circuit that maintains the output voltage constant while the voltage across the super capacitor decreases due to its discharge. When viewed from a different perspective, this decreasing voltage relationship also dictates that the storage of useful quantities of electrical energy in a capacitor of practical electrical and physical size requires the capacitor to operate under conditions of large terminal voltage swing. This characteristic is however poorly suited to direct bus shunting use of such capacitors in an aircraft or in other electrical bus supplementing applications since a bus is desirably operated with very limited changes in voltage. Enormously sized capacitors are therefore required to store meaningful quantities of usable energy under the conditions of little capacitor voltage change.

The use of an electronic coupling arrangement, i.e., a device such as a direct current to direct current converter switching circuit is seen as an answer to this storage efficiency and other difficulties such capacitor energy storage can encounter. With such a coupling circuit providing energy transfer between a "super capacitor" storage element and the aircraft bus, the capacitor voltage can be allowed to swing through a large range and thereby provide relatively efficient (and again voltage square law-determined) energy storage while the aircraft bus voltage is held nearly constant. Such a coupling arrangement also allows a marriage of incompatible capacitor and bus voltage ratings, allows for controlled or limited current recharging of the capacitor from the bus and other advantages. With respect to the marriage of incompatible capacitor and bus voltage ratings in a bus supplement apparatus, it is perhaps helpful to appreciate that presently available super capacitors are capable of several hundred farads of capacitance within a single physical container and with an operating voltage of 3 to 12 volts. Such capacitors provide a stored energy density of 10 to 20 joules per gram of capacitor weight.

The present invention and each of the above-identified inventions relating to the present invention each concern a different aspect of an aircraft bus supplementing energy storage arrangement disposed generally according to this description. In the present invention the energy storage element itself together with both energy inflow and energy outflow communication with this storage element are considered. The above identified "Super Capacitor Charging", AFD 00193, Ser. No. 08/843,406 patent document provides alternately for the needed energy flow into a super capacitor energy storage element—flow under controlled conditions, while the invention of the above identified "Feedforward Control of Aircraft Bus DC Boost Converter", AFD 00129, Ser. No. 08/843,428 patent document relates to energy flow from a super capacitor element to an aircraft bus load. These two related patent documents in combination therefore provide an alternate arrangement for the combined inflow and outflow arrangement of the present invention.

The U.S. patent art is known to include inventions in which capacitors are used for energy storage, other inventions in which a direct current energy supply bus is incorporated into a vehicle (including an aircraft), inventions concerned with direct current converter circuits and a large number of inventions concerned with the regulation of a voltage level in an electrical circuit. A combination of these concepts and certain refinements in a single invention, particularly in the setting of a load adjacent or distally disposed bi-directional supplement to an aircraft energy supply bus, is nevertheless believed to provide a needed addition to the electrical art and also to be both novel and unobvious in nature.

SUMMARY OF THE INVENTION

The present invention provides for conditioning of the electrical energy obtained from a direct current aircraft energy supply bus through controlled bi-directional electrical energy communication between the aircraft supply bus and a super capacitor energy storage element.

According to the invention, one or more of the super capacitor-based superbattery elements is disposed along the aircraft bus, particularly in locations wherein the bus by way of its length and its loading is subject to transient voltage deviations or energizes transient-sensitive load elements. Energy for supplementing the bus voltage is drawn from the bus over a relatively long duration and added to the bus to maintain bus voltage as needed. Energy drawn from the bus is coupled to the super capacitor storage element and also coupled from the super capacitor storage element back to the bus by a bi-directional chopping type of DC-to-DC inverter circuit which is disclosed in detail.

It is an object of the present invention therefore, to provide improved bus voltage stability for an aircraft direct current energy supply bus.

It is another object of the present invention to provide energy storage supplementation for a direct current aircraft electrical supply bus.

It is another object of the present invention to provide an energy bus supplementation arrangement which may be used to diminish bus voltage decrement transients, minimize short term bus source interruption effects and limit other bus energy supply degradations in an aircraft.

It is another object of the present invention to provide an energy supplementation arrangement which may be adapted for use with a variety of different aircraft bus voltages.

It is another object of the present invention to provide controlled conditions replacement of electrical energy that is being withdrawn from a direct current aircraft energy supply bus, replacement from the same direct current aircraft energy supply bus.

It is another object of the present invention to provide electrical energy communication between a direct current energy storage device and a direct current load which may operate at differing electrical voltages.

It is another object of the present invention to provide weight-efficient and volume-efficient non-battery storage of direct current electrical energy in modest quantities in an aircraft environment.

It is another object of the present invention to provide for the automatic switching between energy inflow and energy outflow conditions from a super capacitor energy storage element.

It is another object of the present invention to provide a direct current converter arrangement which is useful to couple an energy storing electrical capacitor to an aircraft electrical bus of substantially constant but transient inclusive electrical potential.

It is another object of the present invention to provide a bi-directional aircraft bus direct current converter of the inductance-based chopper type.

It is another object of the present invention to provide a bi-directional aircraft bus direct current converter which includes both series and shunt current switching paths.

Additional objects and features of the invention will be understood from the following description and claims and the accompanying drawings.

BRIEF DESCRIPTION OF THE DRAWINGS

FIGS. 6a and 6b shows voltage waveforms relating to the FIG. 5 test arrangement.

DETAILED DESCRIPTION

The present invention provides a capacitor-based energy storage arrangement for improved control of voltage transients on a direct current energy supply bus in an aircraft. The invention provides for energy flow into and out of an energy storing capacitor, the inflow being preferably accomplished during conditions of normal or high bus voltage potential, and the outflow during transient conditions of reduced bus voltage. The combination of a super capacitor energy storage element and a bi-directional energy flow regulator is herein referred to as a "superbattery" in view of plural characteristic similarities between the combination and a conventional battery.

Figure 1:
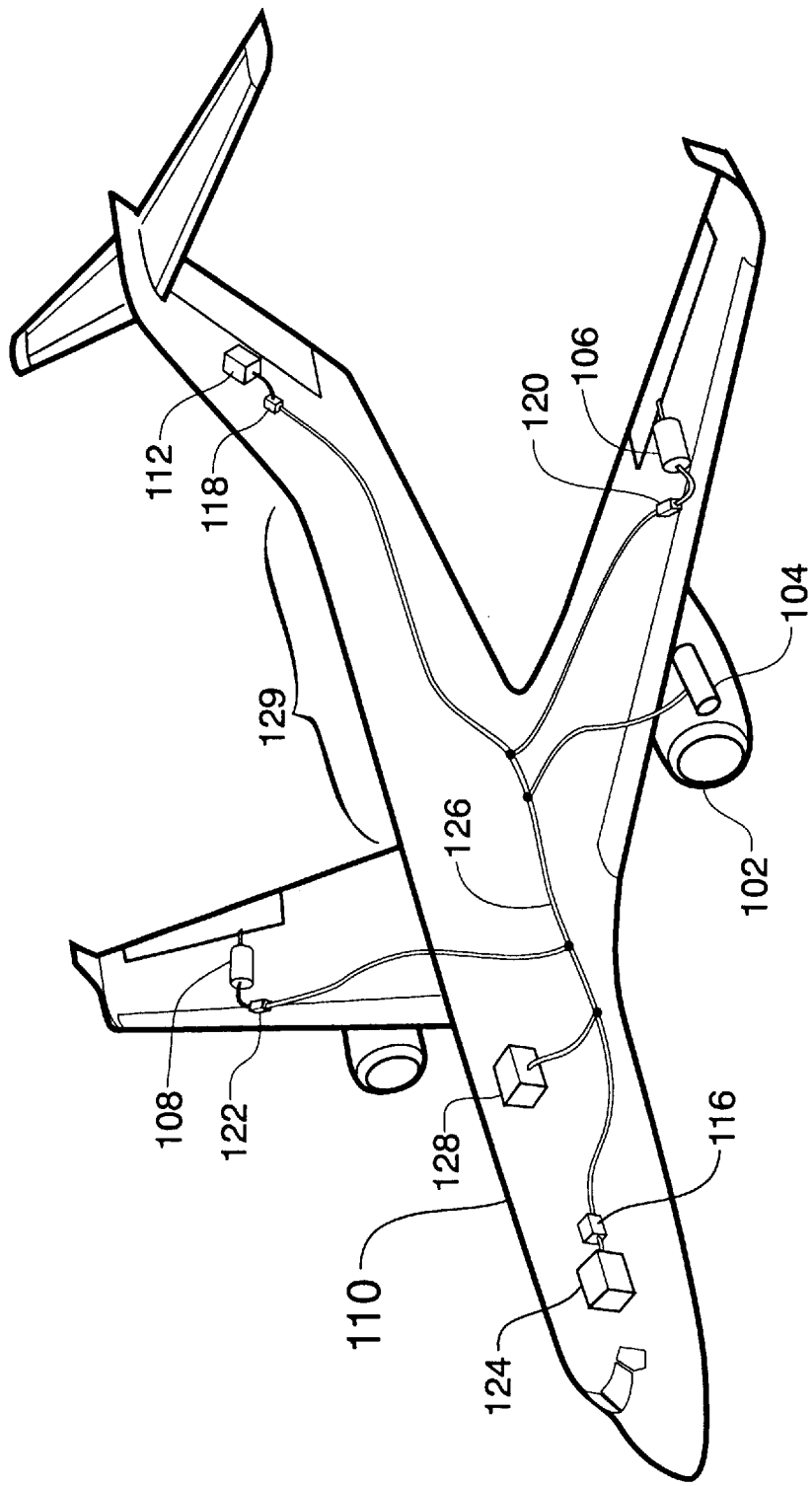
FIG. 1 shows a representative aircraft energy distribution bus with bus loads and bus supplementing apparatus which may include present invention concepts.

FIG. 1 in the drawings shows an aircraft electrical energy distribution system in which a superbattery apparatus according to the present invention may be used. In the FIG. 1 apparatus an aircraft 110 of the medium size passenger type is shown to be provided with a direct current energy supply bus 126 for conveying electrical energy between a plurality of energy sourcing, storing and using devices that are distributed throughout the aircraft 110. The bus 126 may represent a plurality of electrically insulated conductors or a single electrically insulated conductor which operates in conjunction with a common ground path inclusive of the framework, skin metal and other parts of the aircraft 110. Some aircraft use buses of the type represented at 126 for distributing alternating current energy, often multiple phased alternating current energy of some few hundred volts electrical potential, while other aircraft, particularly currently active and older aircraft employ lower voltage direct current bus energization. The designers of future aircraft, however, contemplate the use of higher direct current voltages than the present "standard" of some twenty eight volts direct current for buses of the 126 type. The present invention is believed particularly applicable to such future aircraft arrangements.

Connected to the energy supply bus 126 in FIG. 1 are a plurality of devices which cause the flow of electrical current in the bus conductors. These devices include an electrical generator or alternator and associated rectifier array which are represented at 104 in FIG. 1 and an electrical battery represented at 128 in FIG. 1; these devices act as sources of the electrical energy distributed by the energy supply bus 126. The battery 128 in FIG. 1, which is contemplated to be a conventional electrochemical battery, of course, serves as a temporary repository for electrical energy which originates in the generator/alternator 104 or from ground based energy sources during some phases of aircraft operation. Electrical energy consuming devices represented in the FIG. 1 drawing include the aircraft wing flap positioning motors 106 and 108 and the electronic circuit devices 112 and 124 which are often mounted in remote locations of the aircraft 110—in such regions as the illustrated nose and tail recesses. The illustrated loads are intended to represent other motor and inductive element-inclusive loads and a variety of electronic loads which appear in modern day aircraft. The electronic circuit device loads 112 and 124 may be considered as typically representing a radar system and an avionics computer system for examples. It is perhaps notable that some such electronic loads imposed on aircraft bus systems, loads such as a radar transmitter or a high energy laser, for example, may generate significant bus voltage transients of electronic origin in addition to the electromechanical sources of transient loading already identified.

Figure 3A:
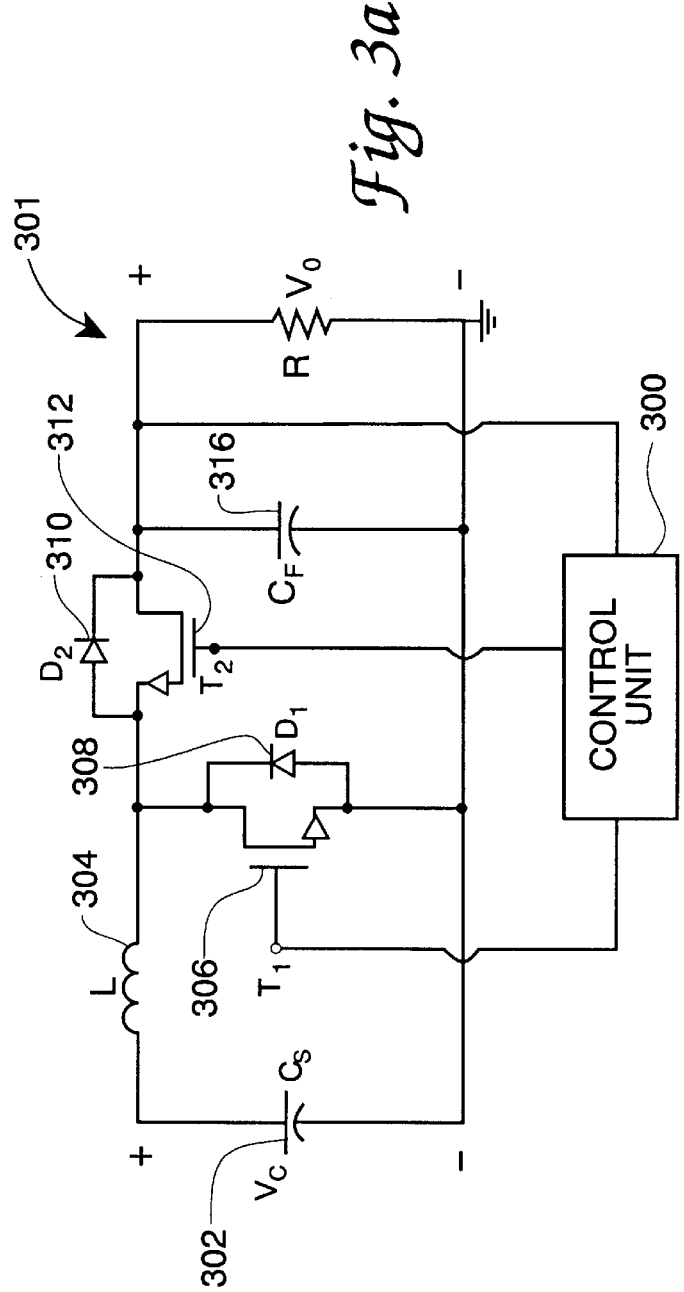
FIG. 3a shows a functional and block diagram of a direct current to direct current converter usable in the present invention.
Figure 3B:
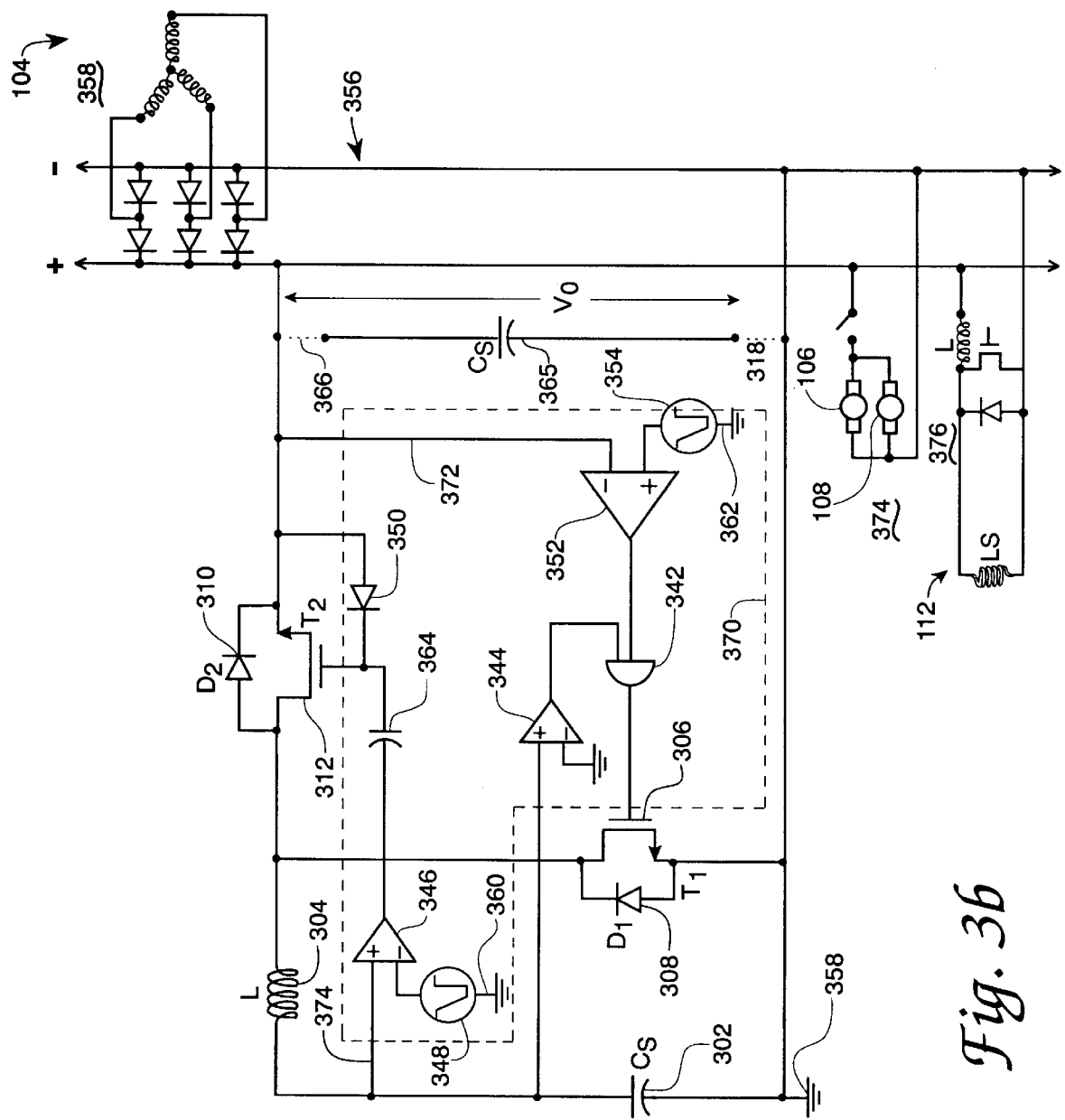
FIG. 3b shows a more complete diagram of a direct current to direct current converter usable in the present invention.

In addition, the two wing flap-controlling rotating electrical machines (i.e., electric motors) appear in electrical schematic form at 374 in FIG. 3b. Also appearing at 378 in FIG. 3b is the well known in the electrical art schematic diagram of a three phase alternator and rectifier array as is identified at 104 above to be a source of electrical energy for the bus 356. (Alternator and diode rectifier arrays of this type have been used in automotive and aircraft battery charging systems since at least the 1950s.)

Additionally appearing at 376 in FIG. 3 is a representative schematic diagram of the FIG. 1 electronic circuit load device 112, e.g., a laser illumination source which employs an additional DC to DC inverter circuit of the type shown at 306 and 308 in FIG. 3a to generate pulsed excitation optical energy from a gaseous flash tube, LS, in order to stimulate a high powered laser.

The physical length of the energy supply bus 126 represented in FIG. 1, particularly the longer length portions of this bus as indicated at 129, inevitably introduces electrical resistance and electrical inductance components of electrical impedance into the aircraft's bus circuit. These components, of course add to the impedance components already present in the generator/alternator 104 and the battery 128 to provide an effective bus impedance that is usually of some low but certainly not zero value. This effective impedance is, of course greatest at remote locations of the bus such as in the locations occupied by the electronic circuit device 112 and the electronic circuit device 124. This impedance although lower in central portions of the aircraft is nevertheless usually of sufficient magnitude even there to provide transient and steady state voltage drops on the bus in response to the heavy current demands of loads such. as the motors 106 and 108 or in response to what is usually the greatest load imposed on an aircraft bus, i.e., current flow to the propulsion engine starting motor. (Most commercial aircraft even when energized by a large ground power unit incur noticeable cabin light dimming with engine starter energization.)

It is, of course the overall intent of the present and the other two above identified patent documents in the present series to minimize the effects of these non zero bus impedances, i.e., to limit the transient and to some degree the steady state voltage changes experienced at various points along the energy supply bus 126. Although these voltage changes are not usually significant with respect to operation of electromechanical devices such as the motors 106 and 108, the incurred brief and temporary voltage changes can be quite a different matter to the typical electronic systems represented by the electronic circuit devices 112 and 124. In such systems energy supply transients can interrupt normal circuit function, become coupled into low level signal circuits, alter the learning of self adapting circuits, change latched or unlatched conditions, change operating modes in sensitive radio frequency devices and even result in component part failures. Practicality and such factors as weight and cost considerations however limit the degree to which such electronic systems can be separately energized from the electromechanical loads in the environment of an aircraft.

Through the addition of energy storing elements located close to sensitive loads such as the electronic circuit devices 112 and 124 and possibly also close to heavy electromechanical loads it is found that many of the harmful voltage transients encountered on an aircraft bus can be either eliminated or reduced in magnitude or slowed in onset (i.e., high frequency energy content attenuated) to the point of reducing their effect on sensitive loads such as the electronic circuit device 112 and 124. These elimination, reducing and slowing effects may for example significantly reduce the electromagnetic coupling of such transients to sensitive internal components of the electronic circuit devices 112 and 124 or alternately may bring the correction of such transients within the capability of power supply filters and regulators usually incorporated in such devices. In order to provide this transient attenuation capability it is, of course recognized that significant quantities of electrical energy must be transferred and transferred over relatively short time intervals.

In the present series of patent documents, this correction of transients on the energy supply bus 126 is based on the energy storage capability of large electrolytic capacitors. A preferred group of these capacitors has become known as super capacitors. This correction is based not on the low electrical impedance such capacitors may offer at their terminals but on the energy storage ability such capacitors can provide when operated over relatively large swings of terminal voltage. (Use of the former low impedance characteristic results in volumetric and weight efficiencies which are deemed too low for aircraft use since much of the capacitor's voltage capability is wasted in storing energy that is never accessed by the aircraft bus, i.e., in Coulombs of energy vested in capacitor voltages lower than that which can be tolerated on the energy supply bus 126.) In the present of these patent documents one arrangement for communicating electrical energy between a super capacitor storage element and the aircraft bus 126, a bi-directional communication arrangement, is addressed. In the FIG. 1 drawing super capacitor-inclusive energy storing elements and the presently described super capacitor to bus coupling arrangement may be physically disposed in the locations indicated at 116, 118, 120 and 122 for example.

A DC-to-DC pulse-width-modulated (PWM) switching-mode power converter, i.e., the converter preferably used in the locations 116, 118, 120 and 122 in FIG. 1, processes power by a sequence of energy transfer cycles. In each of these cycles a quantum of energy is taken from an input source and transferred to a load via an electrical circuit containing magnetic energy storage devices (an inductor), a high speed switching device, and usually also containing additional capacitors. These converters, in order to be used effectively, need some control arrangement which can provide appropriate supervision of the energy transfer process.

Voltage regulation of a direct current to direct current pulse width modulated switching-mode power converter is commonly accomplished through a closed-loop negative feedback control arrangement. Under such control the output voltage of the converter circuit is sensed and compared with a fixed reference voltage. If the output voltage of the converter circuit undergoes changes caused by either input voltage or load current variations, an error signal is generated in the feedback circuit; the amplitude of this error signal is related to the amplitude of the output voltage change. The pulse width modulation parameters in the converter are then successively changed until an amount which precisely compensates for and eliminates the error signal is found. This change also, of course accomplishes the needed change in the converter output level.

In a pulse width modulated system such as this the time intervals associated with the turning ON and OFF of a switching power device therefore provide an "area under the curve"—accomplished control of the converter output. In this control or regulation the inductive energy storage element is used to store energy of the successive pulse-transferred quantums of energy and thereby achieve conversion of these quantums of energy into smooth and undulation-free direct current. The inductive energy storage element also enables the voltage boost or voltage decrease capability of the converter through an application of the concept that inductor voltage is determined by the product of inductance magnitude and rate of change of current (the V=L, di/dt) concept. In order to obtain the pulse width modulated signal used within the converter, the error signal and a pulsating waveform of sloped waveshape such as a sawtooth waveform may be mixed or "ANDED" in some fashion such as supplying each signal to opposite terminals of a comparator circuit. Such a comparator circuit in turn, produces a pulse width modulated output signal used for driving the inductor-controlling switching power device.

Figure 2:
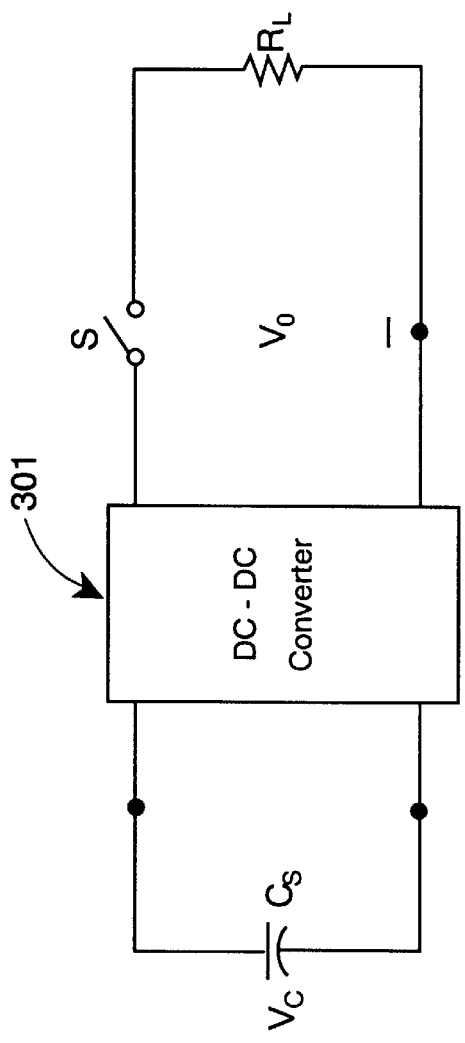
FIG. 2 shows the super capacitor and direct current to direct current converter which comprise a superbattery according to the present invention.

FIG. 2 in the drawings is a block diagram showing a preferred arrangement of a superbattery according to the present invention. The FIG. 2 Superbattery consists of a super capacitor, Cs, a direct current to direct current power converter, and a direct current load which is for FIG. 2 purposes represented as a resistor $R_L$. In the present invention the resistor $R_L$ is actually an aircraft electrical supply bus which is being augmented by the FIG. 2 apparatus. In the simplified diagram of FIG. 2 when the load is connected to the superbattery by the switch S, energy may be transferred from the super capacitor to the load $R_L$ and the voltage $V_O$ across the load is thereby regulated. When the voltage $V_O$ exceeds a predetermined level, energy is also transferred from the aircraft bus load backward through the direct current to direct current converter and charges the super capacitor. The FIG. 2 direct current to direct current converter therefore has two functions: (1) output voltage regulation in a super capacitor to aircraft bus energy flow operating mode and (2) super capacitor charging in a aircraft bus to super capacitor energy flow mode of operation.

FIG. 3a is a circuit diagram of a bi-directional direct current to direct current converter 307 which may be used in the present invention, including a block showing connection of the converter control circuitry. In the regulation mode, or the capacitor to aircraft energy bus mode of operation the FIG. 3a circuit acts like a boost direct current to direct current converter. In this mode, transistor $T_2$ and diode $D_1$ are always turned OFF. Transistor $T_1$, and diode $D_2$ are alternately switching ON and OFF at a high switching frequency. The output voltage $V_O$ is regulated by varying the transistor on-duty cycle $D=t_{on}/T$, where $t_{on}$ is time interval when the transistor $T_1$, is ON and T is the period of the converter switching frequency. During this mode, stored energy is transferred from the super capacitor to the load in switching frequency increments and the voltage across the load, i.e. the aircraft bus, is maintained constant in spite of the fact that the voltage across the super capacitor decreases because of its discharging.

In the super capacitor charge mode, the circuit acts like a buck direct current to direct current converter. In this mode, transistor $T_1$ and diode $D_2$ are always OFF, whereas the transistor $T_2$ and diode Di are alternately switching ON and OFF at the converter switching frequency. The super capacitor is charged from the aircraft bus during this mode. Other types of direct current to direct current converter can be used instead of the circuit shown FIG. 3A, converters such as resonant direct current to direct current converters, PWM converters, etc. Converters with different control strategies, for example, frequency controlled, phase controlled, duty cycle controlled converters, etc. may be included in these other converters.

FIG. 3b is a circuit diagram of the bi-directional energy transfer direct current to direct current converter of FIG. 3a including a possible arrangement of the converter control circuitry and electrical representations of several bus connected electrical components. Component identification numbers are consistent between FIG. 3a and FIG. 3b to the best degree possible. In the FIG. 3b circuit diagram the aircraft bus load is shown at 356, the super capacitor Cs at 302, the inductance L at 304, the diode-transistor pair D1, T1 at 308, 306, this diode-transistor pair D2, T2 at 310, 312 and the control circuit 300 appears within the dotted line enclosure 370. The internal components of the control circuit 300 include an operational amplifier voltage sensing comparator 344, an operational amplifier voltage sensing comparator 352, a logic AND gate 342, an alternating current signal coupling capacitor 364 and its associated charging diode 350. An additional optional filter capacitor appears at 365 in FIG. 3b and sources of a trapezoidal shaped waveform (e.g., a clipped sawtooth waveform) signal appear at 348 and 354 within the control circuit.

During operation of the FIG. 3b converter circuit in the super capacitor 302 to aircraft bus 356 energy transfer mode, the super capacitor 302 is in a charged state and the transistor 306 is pulsed ON and OFF at the rate of the negative trapezoidal waveform 354 (upon satisfaction of the input conditions to comparator 346) to cause energy storage in the magnetic field surrounding the inductor 304. This energy is coupled through the diode 310 to the aircraft energy supply bus 356 during OFF intervals of the transistor 306. The effective current level of this transfer is determined by the current flowing in the inductor 304 at TURN-OFF of the transistor 306, the energy storage action of the inductor tending to sustain the inductor's current flow at transistor TURN-OFF as is well known in the electrical art. The magnitude of the current flow in the inductor during transistor 306 ON time is determined by the relative TURN-ON and TURN OFF times of the transistor 306, longer ON time resulting in larger inductance current level. Such longer ON time is achieved by using longer portions of the trapezoid waveform from source 354, an election accomplished by way of the feedback path 372 which senses aircraft bus voltage level and accomplishes transistor 306 TURN-ON at lower amplitudes (and hence for longer time durations) of the trapezoid waveform when the bus 356 voltage is abnormally low. The comparator 344 and AND gate 342 provide shut-down of the transistor 306 in instances wherein the super capacitor voltage has fallen to zero and the super capacitor-stored bus supplementing energy has thus been depleted.

During operation of the FIG. 3b converter circuit in the reverse or aircraft bus 356 to super capacitor 302 energy transfer mode, the super capacitor 302 is in a discharged state and the transistor 312 is pulsed ON and OFF at the rate of the negative trapezoidal waveform 348 to again cause energy storage in the magnetic field surrounding the inductor 304. This energy is coupled by way of current flow through the diode 308 to the super capacitor during OFF intervals of the transistor 312. The effective current level of this transfer is determined by the current flowing in the inductor 304 at TURN-OFF of the transistor 312, the inductance energy storage of the inductor again tending to sustain the inductor's current flow level at transistor TURN-OFF as known in the electrical art. The level of the current in the inductor 304 during transistor 312 ON time is determined by the relative TURN-ON and TURN OFF times of the transistor 312, longer ON time resulting in larger inductance current level. Such longer ON time is achieved by using longer portions of the trapezoid waveform from source 348, an election accomplished by way of the feedback path 374 which senses super capacitor voltage level and accomplishes transistor 312 TURN-ON at lower amplitudes (and hence for longer time durations) of the trapezoid waveform when the super capacitor voltage is abnormally low. If desired, a not shown comparator and AND gate as used at 344 and 342 may be used to provide shut-down of the transistor 312 in instances wherein the bus voltage has fallen to excessively low voltage values and additional bus loading for super capacitor charging is therefore deemed inappropriate.

The trapezoid waveforms at 348 and 354 in FIG. 3b may be realized in an electronic circuit which generates a sawtooth waveform through constant current charging of an electrical capacitor element and then clipping this waveform at some appropriate amplitude to achieve the flat top of the trapezoid waveshape. This flat topped waveshape is preferable for use in the FIG. 3b circuit since it allows finite charging times for the inductor 304 even when operation at the magnitude extremities of the waveform occur—as opposed to the very brief or zero time intervals at the peak of the more conventional sawtooth waveform. Preferably the flat top of each trapezoid waveform shape is located at a voltage corresponding to the desired operating voltage of the aircraft bus in the case of the waveform source 348 and at the upper desired voltage extremity of the super capacitor in the case of the waveform source 354. The trapezoid waveforms thereby provide not only time varying inductor current regulation but also voltage limit regulation points for the switching transistors. In a sense, therefore, the trapezoid waveforms provide the needed reference voltage levels for control of the switching transistors 306 and 312.

The capacitor 364 and its recharging diode 350 provide alternating current coupling for the pulse signals originating in the comparator 346 in the case of the transistor 312. Such alternating current coupled connection of the transistor 312 is desirable since this transistor is not operated in the grounded source condition but has its source electrode connected to the voltage of the bus 156, a voltage which is "up in the air" and which may vary. A source of direct current voltage more positive than that of the aircraft bus 356 would also be necessary to drive the transistor 312 if this alternating current coupling were not used. A discharge path for the capacitor 364 may be necessary when the transistor 312 is selected as the illustrated field-effect transistor type; in the case of a junction transistor being used at 312 the transistor itself may provide such a discharge path.

Depending on use of the FIG. 3b apparatus and other factors it may be possible to employ a single source of trapezoid waveforms for the sources 348 and 354. In situations where alternating or other non simultaneous operation of the transistors 306 and 312 is desired, two individual trapezoid waveform sources as shown in FIG. 3b is the preferred arrangement. The FIG. 3b circuit presumes voltages suitable for digital logic use are available as output signals of the comparators 344, 346, and 352; positive-most signals are assumed to be of logic 1 or true value. The aircraft electrical bus 356 may be of the grounded type as represented at 358 in FIG. 3b where grounding of the negative bus conductor is indicated, or alternately of the ungrounded type.

The capacitor 365 in FIG. 3b is indicated by the dotted connections at 366 and 368 to be of an optional or sometimes needed nature in the circuit. Since the energy supplied from the FIG. 3b circuit occurs in a series of high frequency pulsations or quantums of energy, some smoothing or filtering of these energy quantums may be desirable before they are applied to the bus 356. Such filtering can be provided in the form of a conventional filtering capacitor as represented by the capacitor 365. Note however that this capacitor is connected directly across the bus 356 so that bus transient load currents can be expected to flow in this capacitor as well. Some decoupling of the capability 365 from the bus as by a diode may be advantageous because of this bus current flow effect, however, rearrangement of the feedback path 372 may also be needed in such instances.

Figure 4A:
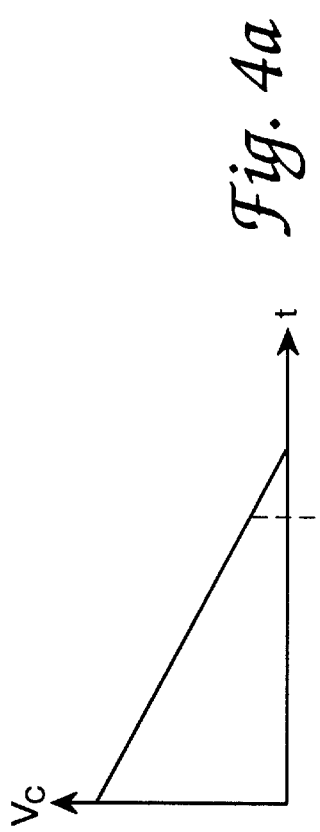
FIG. 4a shows a graphic representation of super capacitor voltage during operation of the FIG. 3 direct current to direct current converter.
Figure 4B:
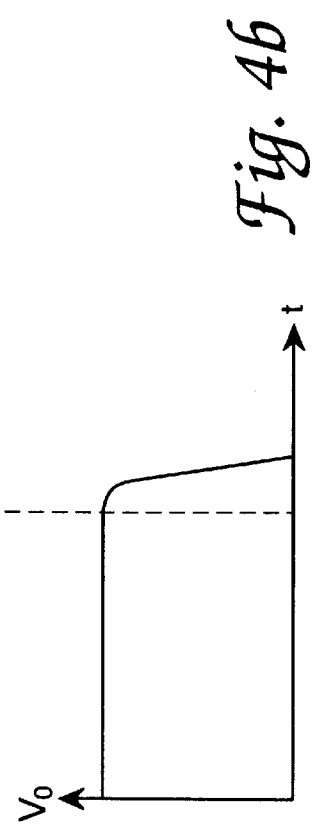
FIG. 4b shows a graphic representation of direct current to direct current converter output voltage during operation of the FIG. 3 converter and in response to FIG. 4a super capacitor voltage.

FIG. 4a in the drawings shows a waveform of super capacitor voltage $V_C$ versus time t during the discharge mode of converter operation. The large voltage change and complete discharge of the super capacitor represented in this drawing implies maximum utilization of the energy storage ability of the super capacitor. Preferably in using the present invention, it is desirable to employ discharging of the super capacitor which is at least one half of the super capacitor's maximum energy storing capability in view of aircraft weight and space limitations. Clearly the unconditioned voltage of a discharging super capacitor operating under these or arty such conditions is not useful to directly supply most electronic systems and a converter circuit as shown in the present invention is needed. FIG. 4b shows a waveform of the output $V_O$ from the FIG. 3 converter 301 versus time t. As shown in FIG. 4b the direct current to direct current converter regulates the output voltage $V_O$ until the super capacitor discharge is almost complete. Most regulators have a limited DC voltage transfer function and therefore cannot convert a very low voltage input voltage $V_C$ to a specified output voltage $V_O$. The comparator 344 discussed above in connection with FIG. 3b provides a tool for accommodation of this low voltage-response characteristic.

Figure 5:
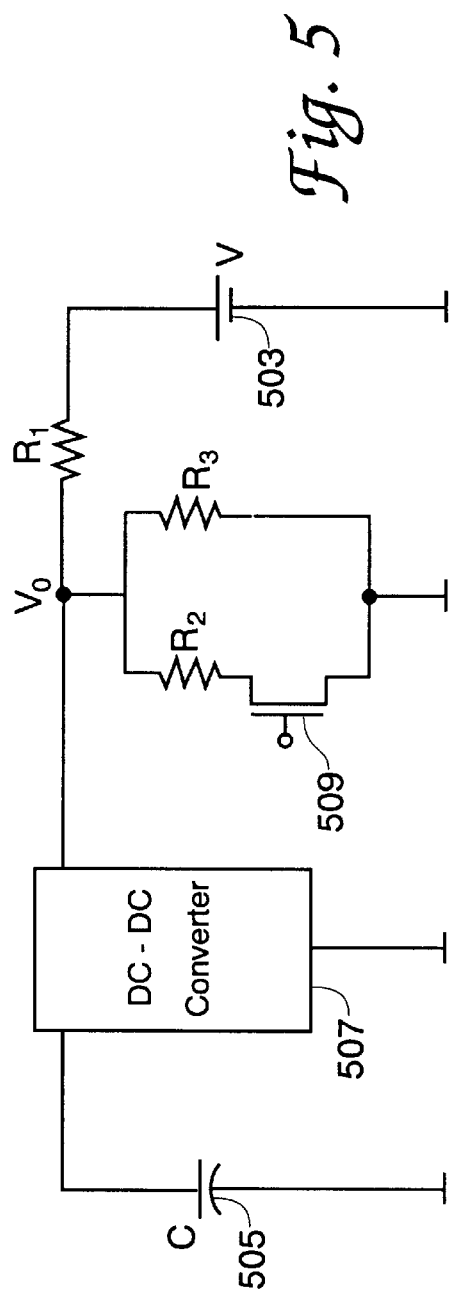
FIG. 5 shows a superbattery and stepped load test arrangement.

FIG. 5 and FIG. 6 of the drawings shows in graphic form the results of applying the present invention to an aircraft bus situation as may exist especially in isolated portions of the bus 126 in FIG. 1. FIG. 5 shows a representative circuit diagram of a superbattery (comprised of the super capacitor 503 and direct current to direct current converter 507), a DC voltage source or battery V, a switched load consisting of $R_2$, $R_3$, and a MOSFET 509 which controls the load R2 . $R_1$ represents the resistance of conductors such as the present aircraft bus which couple the battery source 503 to the loads R2 and R3 in FIG. 5. FIG. 6a shows the voltage waveform $V_C$ to be expected at the switched loads of FIG. 5 without use of the superbattery bus supplement. Under these conditions, it can be seen that the bus voltage $V_C$ is a rectangular wave of frequency determined by the switching rate of the MOSFET 509. When the load resistance is large, the output voltage has a low level of undulation or alternating current component and when the load resistance is small as when transistor 509 is closed, the output voltage has a high level of undulating or alternating current component. The resulting bus voltage is not acceptable to supply energy to many electronic circuits because the peak-to-peak value of the alternating current component of the output voltage $V_C$ is too large. FIG. 6b however shows the change $V_C$ voltage waveform of the switched load as it may appear with addition of an appropriately sized superbattery according to the present invention. The peak-to-peak voltage of the bus is of course reduced with addition of the Superbattery bus supplementation.

Figure 7:
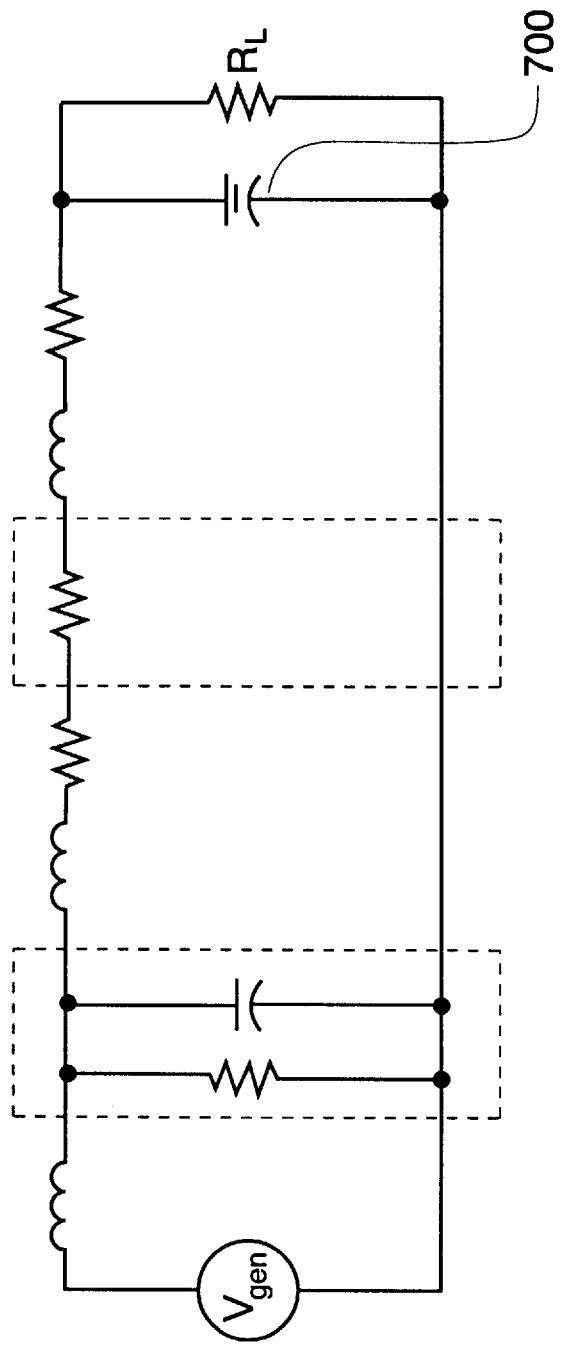
FIG. 7 shows a representative distributed power system equivalent for an aircraft such is an F-22.

FIG. 7 in the drawings shows a representative equivalent schematic portion of a DC distributed power system for an aircraft such as the United States Air Force F-22 tactical aircraft. The DC voltage level of the FIG. 7 power system is 270 Volts. The FIG. 7 power system has some degree of difficulty with regulation of the load voltage when the load increases suddenly. Even if the voltage of the aircraft generator is well regulated, when the load current increases, a large amount of current flows through the equivalent resistances and inductances of the power system. This causes voltage drops across these parasitic components and therefore the voltage across the load decreases. To improve the voltage regulation across the load, the superbattery is placed in parallel with the load as indicated at 700 in FIG. 7. When the line voltage drops due to the flow of large currents through the parasitic components, the superbattery transfers energy to the load to regulate the aircraft bus voltage. When the load current is reduced, the load voltage increases and the excess energy is transferred to the super capacitor thereby helping to reduce the line voltage closer to the nominal bus value.

Applications of super capacitors are numerous: memory backup power supplies for computers, timers, security systems, programmable controllers, smoke detectors, emergency lights, starters, actuators, ignition systems for automobiles, emergency power sources for aircraft, voltage regulation of systems with switched loads such as radars, sources of instantaneous power levels for aircraft actuators and electric vehicle motor drives. The superbattery can be used as a backup energy source for many applications, such as computer memories, critical loads in aircraft under emergency situations, and smoke detectors.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Direct current aircraft electrical energy distribution apparatus comprising the combination of:

a source of direct current electrical energy located in a first portion of said aircraft;

an electrical bus having electrical bus conductors, including an electrically insulated conductor, connected with said source of direct current electrical energy, extending throughout said aircraft, including remote second portions of said aircraft, and connected in energizing relationship with a plurality of electrical transient generating aircraft electrical load devices also disposed throughout said aircraft;

a plurality of electrical energy storage devices located at selected distributed locations disposed throughout said aircraft and connected locally to said electrical bus conductors at selected distributed bus locations, said electrical energy storage devices including a capacitor element and an energy coupling electronic converter circuit of bi-directional energy flow capability communicating transient flows of electrical energy from said electrical bus conductors to said capacitor and from said capacitor to said electrical bus conductors in response to selected bus operating conditions;

said energy coupling electronic converter circuit comprising an electrical inductance element connected with said capacitor element and in series with said flows of electrical energy to and from said capacitor, a series connected first electrical switching element connected with said electrical inductance element and generating first electrical current undulations in said inductance element during first direction energy flows therein, a shunt-connected second electrical switching element also connected with said electrical inductance element and generating second electrical current undulations in said inductance element during second direction energy flows therein, and an electrical voltage regulator controller of pulse width time parameters of said electrical inductance element first and second electrical current undulations;

said electrical voltage regulator controller being pulse width time parameters-responsive to voltage levels appearing on said aircraft electrical bus adjacent each said electrical energy storage device;

said electrical voltage regulator controller including a trapezoidal waveshape regulation-determining pulsed voltage reference signal having a sloped leading edge and a flat constant voltage trailing portion of amplitude equal to a nominal operating voltage level of said aircraft electrical bus.

2. The direct current aircraft electrical energy distribution apparatus of claim 1 wherein said plurality of electrical energy storage devices located at selected distributed locations include capacitive electrical energy storage elements disposed in physical proximity with electronic apparatus loads having large transient energy current flow characteristics.

3. The direct current aircraft electrical energy distribution apparatus of claim 1 wherein said plurality of electrical energy storage devices located at selected distributed locations disposed throughout said aircraft include capacitive electrical energy storage elements located within electronic systems enclosures in physical proximity with electrical transient-generating bus-loading electronic apparatus.

4. The direct current aircraft electrical energy distribution apparatus of claim 1 wherein said electrical energy storage devices first and second electrical switching elements comprise one of a transistor and another semiconductor switching device.

5. The direct current aircraft electrical energy distribution apparatus of claim 1 wherein said electrical voltage regulator controller is a closed loop negative feedback voltage regulator having two of said trapezoidal waveshape Pulsed voltage reference signals, one controlling a capacitor charging operating mode and one controlling a capacitor discharging operating mode.

6. The direct current aircraft electrical energy distribution apparatus of claim 1 wherein said electrical voltage regulator controller includes periodic waveform generating electrical circuit means for generating said trapezoidal waveshape pulsed voltage reference signal and electrical circuitry selecting pulse width time parameters of said trapezoidal waveform generated by said periodic waveform generating electrical circuit means.

7. The direct current aircraft electrical energy distribution apparatus of claim 1 wherein said electrical voltage regulator controller includes an electrical inductance element connected in electrical series with said transient flows of electrical energy, one node of said electrical inductance element connecting with said super capacitor, and another node of said electrical inductance element connecting with said series-connected first electrical switching element and said shunt-connected second switching element.

8. The direct current aircraft electrical energy distribution apparatus of claim 1 further including electrical diode elements connected in reverse current direction shunt with said first electrical switching element and said second electrical switching element.

9. The direct current aircraft electrical energy distribution apparatus of claim 1 wherein, said electrical bus comprises a single electrically insulated conductor and an aircraft frame inclusive common return conductor.

10. The direct current aircraft electrical energy distribution apparatus of claim 1 wherein said aircraft electrical load devices include both rotating electrical machine and electronic circuit loads.

11. The direct current aircraft electrical energy distribution apparatus of claim 1 wherein said source of direct current electrical energy located in a first portion of said aircraft comprises a multiple phased alternator and a multiple diode rectifier array having a direct current output potential in excess of one hundred volts and said alternator comprises a portion of a propulsion engine apparatus located in one of a fuselage cavity and an exterior surface of said aircraft.

12. The direct current aircraft electrical energy distribution apparatus of claim 1 wherein said energy coupling electronic circuit includes first and second current direction controlling voltage responsive electrical circuitry connected to one of said aircraft electrical bus and said super capacitor element.

13. The method of supplying direct current electrical energy of limited transient noise content to electrical loads located at physically separate points along an aircraft energy supply bus, said method comprising the steps of:

supplementing electrical energy supplied via said aircraft energy supply bus to one of an electrical transient-generating load and an electrical transient sensitive load with electrical energy previously removed from said bus at a controlled removal rate and held in storage adjacent said load;

storing said previously removed electrical energy in an electrical capacitance storage element located adjacent said load;

operating said electrical capacitance storage element over a change of voltage range characteristic of removing and replacing at least one half the energy stored in said electrical capacitance storage element, a range exceeding electrical voltage transient amplitudes acceptable on said aircraft energy supply bus;

coupling energy from said electrical capacitance storage element to said energy supply bus of lesser voltage transient range via an electronic switching circuit-modulated electrical inductive element of variable coupling ratio, an element also located adjacent said load;

controlling said electrical capacitance storage element to aircraft energy supply bus variable coupling ratio according to an aircraft energy supply bus transient-responsive closed loop control algorithm;

controlling said flow of electrical energy previously removed from said bus and supplied to said electrical capacitance storage element according to a voltage-responsive control algorithm.

14. The method of supplying direct current electrical energy of claim 13 wherein said aircraft energy supply bus transient-responsive closed loop control algorithm is responsive to a decreased voltage level received from said electrical bus.

15. The method of supplying direct current electrical energy of claim 14 wherein said electronic switching circuit-modulated electrical inductive element of variable coupling ratio is a pulse width modulation-controlled variable coupling ratio.

16. The method of supplying direct current electrical energy of claim 13 wherein said step of coupling energy from said electrical capacitance storage element to said energy supply bus of lesser voltage transient range via an electronic switching circuit-modulated electrical inductive element of variable coupling ratio further includes the step of disconnecting said inductive element from said aircraft energy supply bus during operating cycle portions of said electronic switching circuit modulation.

17. The method of supplying direct current electrical energy of claim 13 wherein said step of supplementing electrical energy supplied via said aircraft energy supply bus to an electrical transient-generating load with electrical energy previously removed from said bus at a controlled removal rate includes supplying electrical energy to said electrical capacitance storage element from said bus and delivering electrical energy from said electrical capacitance storage element to said bus through a common bi-directional current flow-capable direct current to direct current converter circuit.

18. Direct current aircraft electrical energy distribution apparatus comprising the combination of:

a source of direct current electrical energy located in a first portion of said aircraft;

an electrical bus having electrical bus conductors, including an electrically insulated conductor, connected with said source of direct current electrical energy, extending throughout said aircraft, including remote second portions of said aircraft, and connected in energizing relationship with a plurality of electrical transient generating electromagnetic, and electrical transient-sensitive electronic, aircraft electrical load devices also disposed throughout said aircraft;

a plurality of electrical energy storage devices located at selected distributed locations disposed throughout said aircraft and connected locally to said electrical bus conductors at selected distributed bus locations, said electrical energy storage devices including an electrolytic super capacitor element and an energy coupling electronic converter circuit of bi-directional energy flow capability communicating transient flows of electrical energy from said electrical bus conductors to said super capacitor and from said super capacitor to said electrical bus conductors in response to selected bus voltage operating conditions and selected super capacitor voltage operating conditions;

said energy coupling electronic converter circuit comprising:

an electrical inductance element connected with said super capacitor and in series with said flows of electrical energy to and from said super capacitor, series connected first electrical switching means connected between said electrical inductance element and said aircraft electrical bus for generating first electrical current undulations in said inductance element during aircraft bus to super capacitor energy flow events, shunt connected second electrical switching means connected across a series combination of said super capacitor element and said electrical inductance element for generating second electrical current undulations in said inductance element during super capacitor to aircraft electrical bus energy flow events, first electrical voltage regulating controller means responsive to a voltage level of said aircraft bus for controlling duty cycle ON and OFF times of said series connected first electrical switching means, second electrical voltage regulating controller means responsive to a voltage level of said super capacitor for controlling duty cycle ON and OFF times of said second electrical switching means, said first electrical voltage regulating controller means and said second electrical voltage regulating controller means each including sloped leading edge waveform signal source means for generating varied duty cycle ON and OFF times of said first and second electrical switching means in response to a regulated signal sensed variation.

19. The direct current aircraft electrical energy distribution apparatus of claim 18 wherein:

said source of direct current electrical energy includes one of an engine driven electrical generator and an engine driven electrical alternator plus rectifier array connected to a selected point on said electrical bus;

said source of direct current electrical energy also includes an electrochemical battery element connected to a selected point on said electrical bus;

said plurality of electrical energy storage devices include one of said electrical energy storage devices connected to said electrical bus at a physical location adjacent one of said electrical transient-sensitive aircraft electronic aircraft load devices;

at least one of said first electrical voltage regulating controller means and said second electrical voltage regulating controller means include means for terminating operation of said electronic converter circuit in response to a sensed low voltage condition.

* * * * *